United States Patent [19]
Olarig

[11] Patent Number: 5,740,188
[45] Date of Patent: Apr. 14, 1998

[54] ERROR CHECKING AND CORRECTING FOR BURST DRAM DEVICES

[75] Inventor: Sompong P. Olarig, Cypress, Tex.

[73] Assignee: Compaq Computer Corporation, Houston, Tex.

[21] Appl. No.: 654,853

[22] Filed: May 29, 1996

[51] Int. Cl.[6] .................................................. G06F 11/10
[52] U.S. Cl. ............................................................... 371/40.11
[58] Field of Search ................................................ 371/40.1

[56] References Cited

U.S. PATENT DOCUMENTS

| | | | |
|---|---|---|---|
| 5,452,261 | 9/1995 | Chung et al. | 365/233 |
| 5,577,004 | 11/1996 | Leshem | 365/230.03 |

*Primary Examiner*—Stephen M. Baker
*Attorney, Agent, or Firm*—Fish & Richardson P.C.

[57] ABSTRACT

A method is described of detecting and correcting errors in a computer having a memory subsystem including a burst DRAM device. The method includes the steps of beginning a write operation of N data bits to the burst DRAM device, generating M check bits from the N data bits, writing the N data bits and the M check bits to the burst DRAM device, reading the N data bits and M check bits from the burst DRAM device, generating X syndrome bits from the N data bits and the M check bits, and using the X syndrome bits to detect and correct any single bit error within the N data bits and the M check bits and to detect any double bit error within the N data bits and the M check bits. A computer system is also described having a central processing unit and a memory subsystem. The memory subsystem includes a burst DRAM device, a memory controller arranged to control the burst DRAM device in response to instructions received from the central processing unit, data format conversion circuitry arranged to convert between a data format readable by the burst DRAM device and a data format readable by the memory controller, and ECC circuitry arranged to encode a data word with an error correction code in response to a write instruction and to decode the data word and conduct error correcting and detecting in response to a read instruction.

11 Claims, 7 Drawing Sheets

PRIOR ART

|  | ←——————————————————————————— Data Bits ———————————————————————————→ | ←— Check Bits —→ |
|---|---|---|
| | 0000 0000 1111 1111 2222 2222 3333 3333 4444 4444 5555 5555 6666 6666 | cccc cccc |
| | 0123 4567 8901 2345 6789 0123 4567 8901 2345 6789 0123 4567 8901 2345 | 0123 4567 |
| 1110 0000 | 1010 1110 0011 0000 1010 1011 0010 1000 0110 1110 1000 1000 0001 1000 | 1000 0000 |
| 1010 1001 | 0101 0011 1010 1000 1000 0010 1010 0011 0010 1011 0111 0000 0110 0000 | 0100 0000 |
| 0001 0010 | 1001 0000 1110 0100 0010 0110 0111 0001 1010 1010 1010 0110 0010 1101 | 0010 0000 |
| 0000 1100 | 0010 1010 0000 0110 0110 1001 0111 1110 0100 1010 0100 1010 0110 0000 | 0001 0000 |
| 0001 0001 | 0000 0001 0101 0011 1001 0001 1001 1110 1011 1000 1011 0001 0011 1000 | 0000 1000 |
| 0100 1111 | 0100 0101 0001 1011 0100 1000 0000 0001 1110 0000 0000 1101 1000 1011 | 0000 0100 |
| 1001 0110 | 1010 0101 1001 1010 1010 0001 0100 0100 0000 0111 0101 0010 1000 0111 | 0000 0010 |
| 0110 0000 | 0101 1001 0101 1001 1001 1010 0000 0000 1001 0101 0000 0000 1101 0101 | 0000 0001 |

FIG. 7

| | | | | | | | |
|---|---|---|---|---|---|---|---|
| 00 No Error | 20 CB05 | 40 CB06 | 60 UNCER | 80 CB07 | A0 UNCER | C0 UNCER | E0 DB56 |
| 01 CB00 | 21 UNCER | 41 UNCER | 61 DB13 | 81 UNCER | A1 DB01 | C1 DB45 | E1 UNCER |
| 02 CB01 | 22 UNCER | 42 UNCER | 62 DB20 | 82 UNCER | A2 DB09 | C2 DB47 | E2 UNCER |
| 03 UNCER | 23 DB28 | 43 DB00 | 63 UNCER | 83 DB02 | A3 UNCER | C3 UNCER | E3 DB15 |
| 04 CB02 | 24 UNCER | 44 UNCER | 64 DB06 | 84 UNCER | A4 DB40 | C4 DB61 | E4 DB63 |
| 05 DB60 | 25 DB60 | 45 DB08 | 65 UNCER | 85 DB30 | A5 UNCER | C5 UNCER | E5 UNCER |
| 06 UNCER | 26 DB39 | 46 DB16 | 66 UNCER | 86 DB11 | A6 UNCER | C6 UNCER | E6 UNCER |
| 07 DB18 | 27 UNCER | 47 UNCER | 67 UNCER | 87 UNCER | A7 UNCER | C7 UNCER | E7 UNCER |
| 08 CB03 | 28 UNCER | 48 UNCER | 68 DB05 | 88 UNCER | A8 DB25 | C8 DB29 | E8 UNCER |
| 09 UNCER | 29 DB52 | 49 DB10 | 69 UNCER | 89 DB12 | A9 UNCER | C9 UNCER | E9 UNCER |
| 0A UNCER | 2A DB04 | 4A UNCER | 6A UNCER | 8A DB57 | AA UNCER | CA UNCER | EA UNCER |
| 0B DB14 | 2B UNCER | 4B UNCER | 6B UNCER | 8B UNCER | AB UNCER | CB UNCER | EB UNCER |
| 0C UNCER | 2C DB33 | 4C DB54 | 6C UNCER | 8C DB21 | AC UNCER | CC UNCER | EC UNCER |
| 0D DB26 | 2D UNCER | 4D UNCER | 6D UNCER | 8D UNCER | AD UNCER | CD UNCER | ED UNCER |
| 0E DB58 | 2E UNCER | 4E UNCER | 6E UNCER | 8E UNCER | AE UNCER | CE UNCER | EE UNCER |
| 0F UNCER | 2F DB42 | 4F DB46 | 6F UNCER | 8F DB34 | AF UNCER | CF UNCER | EF UNCER |
| 10 CB04 | 30 UNCER | 50 UNCER | 70 DB62 | 90 UNCER | B0 DB23 | D0 DB27 | F0 UNCER |
| 11 UNCER | 31 DB41 | 51 DB31 | 71 UNCER | 91 DB59 | B1 UNCER | D1 UNCER | F1 DB19 |
| 12 UNCER | 32 DB07 | 52 DB51 | 72 UNCER | 92 DB32 | B2 UNCER | D2 UNCER | F2 DB15 |
| 13 DB24 | 33 UNCER | 53 UNCER | 73 UNCER | 93 UNCER | B3 UNCER | D3 UNCER | F3 UNCER |
| 14 UNCER | 34 DB03 | 54 DB03 | 74 UNCER | 94 DB17 | B4 UNCER | D4 UNCER | F4 DB63 |
| 15 DB48 | 35 UNCER | 55 UNCER | 75 UNCER | 95 UNCER | B5 UNCER | D5 UNCER | F5 UNCER |
| 16 DB50 | 36 UNCER | 56 UNCER | 76 UNCER | 96 UNCER | B6 UNCER | D6 UNCER | F6 UNCER |
| 17 UNCER | 37 UNCER | 57 UNCER | 77 UNCER | 97 UNCER | B7 UNCER | D7 UNCER | F7 UNCER |
| 18 UNCER | 38 DB55 | 58 DB37 | 78 UNCER | 98 DB43 | B8 UNCER | D8 UNCER | F8 DB22 |
| 19 DB36 | 39 UNCER | 59 UNCER | 79 UNCER | 99 UNCER | B9 UNCER | D9 UNCER | F9 UNCER |
| 1A DB38 | 3A UNCER | 5A UNCER | 7A UNCER | 9A UNCER | BA UNCER | DA UNCER | FA UNCER |
| 1B UNCER | 3B UNCER | 5B UNCER | 7B UNCER | 9B UNCER | BB UNCER | DB UNCER | FB UNCER |
| 1C DB35 | 3C UNCER | 5C UNCER | 7C UNCER | 9C UNCER | BC UNCER | DC UNCER | FC UNCER |
| 1D UNCER | 3D UNCER | 5D UNCER | 7D UNCER | 9D UNCER | BD UNCER | DD UNCER | FD UNCER |
| 1E UNCER | 3E UNCER | 5E UNCER | 7E UNCER | 9E UNCER | BE UNCER | DE UNCER | FE UNCER |
| 1F DB44 | 3F UNCER | 5F UNCER | 7F UNCER | 9F UNCER | BF UNCER | DF UNCER | FF UNCER |

FIG. 8

ERROR CHECKING AND CORRECTING FOR BURST DRAM DEVICES

FIELD OF THE INVENTION

The invention relates to error checking and correction for a computer.

BACKGROUND OF THE INVENTION

The memory subsystems of today's computers are under ever-increasing demands for capacity and speed. Microprocessor performance is improving at a very rapid rate, and traditional dynamic random access memories (DRAMs) cannot keep up with microprocessor performance or provide the required memory bandwidth. The gap between processor and memory performance is widening. Cache memory is widely used to alleviate the performance gap, but for cost-sensitive systems, such as personal computers, the added cost of cache memory is prohibitive.

New types of DRAM devices, such as Rambus and synchronous DRAMs, have been introduced to help reduce the memory bottleneck faced by system designers. These "burst DRAM" devices deliver high memory bandwidth by running at very high clock frequency. For example, the clock frequency of the Rambus DRAM is 250 MHz. Burst DRAM devices are currently available from a number of suppliers, including NEC, Toshiba, Samsung, Hitachi, Oki Electronics and LG Semiconductor. The extremely high clock frequency of these devices, together with the high speeds of today's microprocessors, create a system environment that is increasingly noisy. Thus, data in these high speed systems become more vulnerable to errors caused by transient electrical and electromagnetic phenomena. Although a well-designed memory subsystem is extremely reliable, even the best memory subsystem, especially one incorporating burst DRAM devices, has the possibility of a memory device failure.

Memory device failures fall generally into two categories. The first is a soft error, which refers to those errors where data stored at a given memory location change, but where subsequent accesses can store the correct data to the same location with no more likelihood of returning incorrect data than from any other location. Soft errors of this type are generally caused by loss of charge in the DRAM cell. The second type of error is a hard error, which refers to those errors in which data can no longer reliably be stored at a given memory location. Either of these types of errors can lead to catastrophic failure of the memory subsystem.

In an effort to minimize failures due to memory subsystem errors, various error checking schemes have been developed to detect, and in some cases correct, errors in data read from memory. The most simple of the error checking schemes is parity. In a byte-wide parity system, one extra parity bit is appended to every eight bits of data. For "even parity" systems, the parity bit is set such that the total number of ones in the nine-bit word is even. For "odd parity" systems, the parity bit is set to make the total number of ones odd. When data is read from memory, if one of the nine bits changes from one to zero or vise versa, the parity will be incorrect and the error will be detected. This system is limited, however, because there is no way to know which of the nine bits changed. Therefore, single bit errors can only be detected, not corrected. Also, if two bits change, the parity will again be correct and no error will be detected. Parity therefore is capable of detecting only odd numbers of bit errors.

While detection of errors is very useful, it also is desirable to be able to correct certain errors. Error correcting codes ("ECCs") have been developed that both detect and correct certain errors. Generally speaking, the goal of an ECC is to correct the largest possible number of errors with the smallest possible overhead (in terms of extra bits and wait states) to the system.

The "Hamming codes" constitute one well-known class of ECCs and are widely used for error control in digital communications and data storage systems. The Hamming Codes are described in Lin et al., "Error Control Coding, Fundamentals and Applications", Chapter 3 (1982). One subclass of the Hamming codes that is particularly well-suited for memory subsystems includes the single-error-correcting and double-error detecting (SEC-DED) codes. In these codes, the check bits are generated prior to data being written to memory using a parity-check matrix implemented in ECC hardware. In the (72, 64) Hamming code, 8 check bits are generated for 64 bits of data. The check bits are then stored in memory together with the data. When a memory read occurs, the ECC hardware retrieves both the data and the corresponding check bits from memory. The ECC hardware then applies the parity check matrix to the data and the check bits, producing "syndrome bits". If the syndrome bits are all zeros, this indicates there are no errors. If the syndrome bits contain ones, the data are possibly invalid. In the case of a single bit error, the syndrome bits will indicate which bit is in error, and thus allow correction. In the case of double bit errors, the error will be detected, but correction is not possible. A description of the SEC-DED Hamming codes is found in Lin et al, supra, Chapter 16.

Another well-known ECC is the "Reed-Solomon code", widely used for error correction in the compact disk industry. A detailed description of this ECC is found in Hove et al., "Error Correction and Concealment in the Compact Disc System", *Philips Technical Review*, Vol. 40 (1980), No. 6, pages 166–172. The Reed-Solomon code is able to correct two errors per code word. Other conventional ECCs include the b-adjacent error correction code described in Bossen, "b-Adjacent Error Correction", IBM J. Res. Develop., pp. 402–408 (July, 1970), and the odd weight column codes described in Hsiao, "A Class of Optimal Minimal Odd Weight Column SEC-DED Codes", *IBM J. Res. Develop.*, pp. 395–400 (July, 1970). The Hsiao codes, like the Hamming codes, are capable of detecting double bit errors and correcting single bit errors. The Hsiao codes use the same number of check bits as the Hamming codes (e.g., 8 check bits for 64 bits of data), but are superior in that hardware implementation is simplified and the speed of error-detection is improved.

SUMMARY OF THE INVENTION

In one aspect, the invention relates to a method of detecting and correcting errors in a computer having a memory subsystem that includes a burst DRAM device. The method comprises the steps of beginning a write operation of N data bits to the burst DRAM device, generating M check bits from said N data bits, writing the N data bits and the M check bits to the burst DRAM device, reading the N data bits and M check bits from the burst DRAM device, generating X syndrome bits from the N data bits and the M check bits, and using the X syndrome bits to detect and correct any single bit error within the N data bits and the M check bits and to detect any double bit error within the N data bits and the M check bits.

In another aspect, the invention relates to a computer system having a central processing unit and a memory subsystem. The memory subsystem includes a burst DRAM device, a memory controller arranged to control the burst DRAM device in response to memory instructions, data format conversion circuitry arranged to convert between a data format readable by the burst DRAM device and a data format readable by the memory controller, and ECC circuitry arranged to encode a data word with an error correction code in response to receipt by the memory controller of a memory write instruction, the ECC circuitry further being arranged to decode the data word and conduct error correcting and detecting upon receipt by the memory controller of a memory read instruction.

BRIEF DESCRIPTION OF THE DRAWINGS

FIG. 8 is a syndrome table in accordance with the embodiment of FIG. 7.

DESCRIPTION OF THE PREFERRED EMBODIMENTS

Preferred embodiments will now be described with reference to the accompanying figures.

Figure 1:
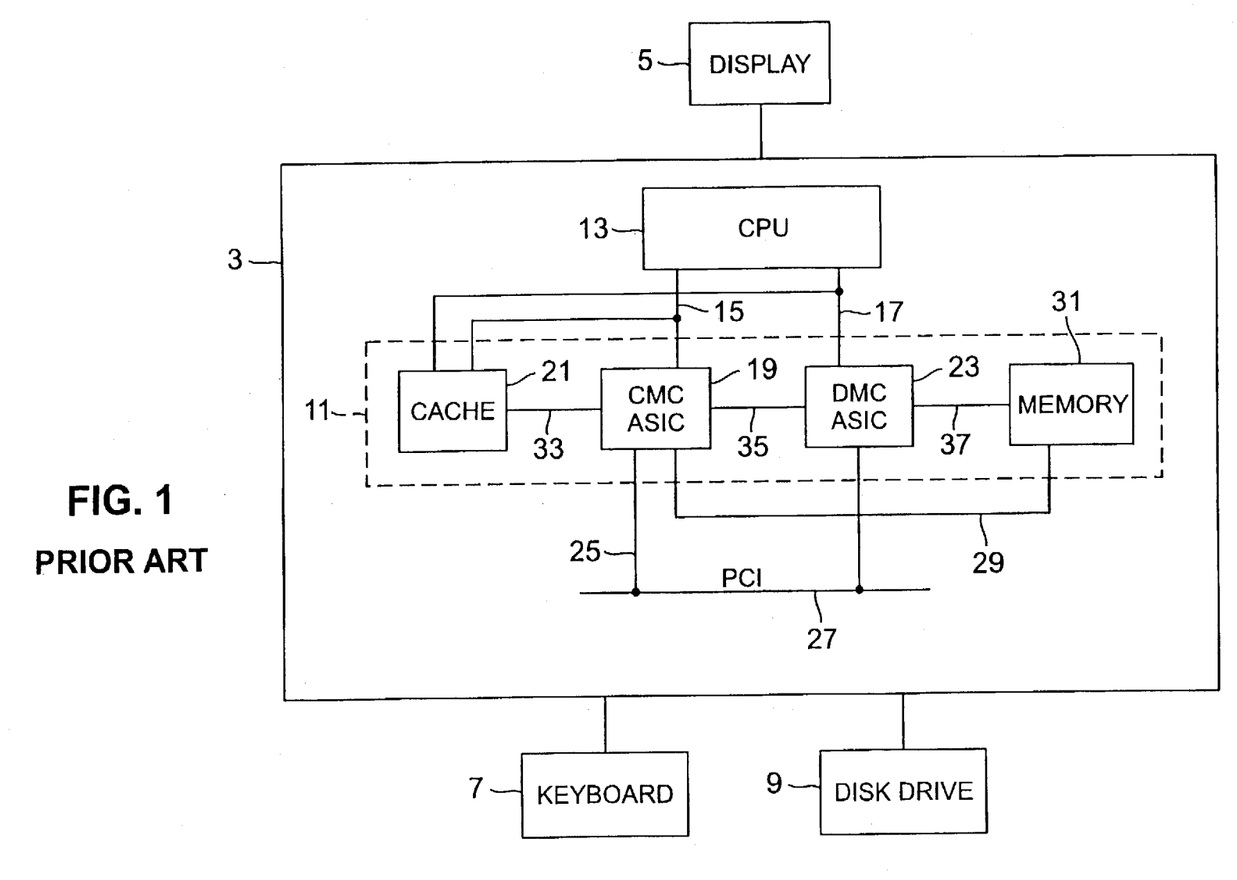
FIG. 1 is a block diagram of a conventional computer system with a memory subsystem.

FIG. 1 is a block diagram representation of a conventional memory subsystem 11 in a computer system. The computer system includes a computer 3 associated with a display 5, a keyboard 7, and a disk drive 9 in a conventional fashion. The memory subsystem 11 communicates with a central processing unit (CPU) 13 having an address bus 15 and a data bus 17. The address bus 15 is connected to a cache and memory control (CMC) application specific integrated circuit (ASIC) 19. The data bus 17 is connected to cache memory 21 and to a data memory control (DMC) ASIC 23. CMC 19 has an address bus 25 that communicates with a peripheral component interface (PCI) 27 and a memory address bus 29 that communicates with memory 31. CMC 19 communicates with cache 21 via bus 33 and with DMC 23 via bus 35. DMC 23 also communicates with memory 31 via data bus 37.

Figure 2:
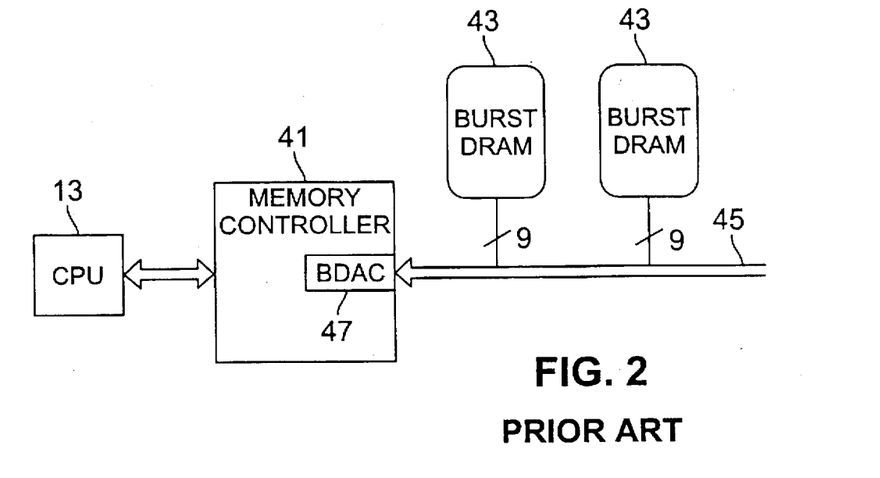
FIG. 2 illustrates the use of burst DRAM devices in a memory subsystem of a computer.
Figure 3:
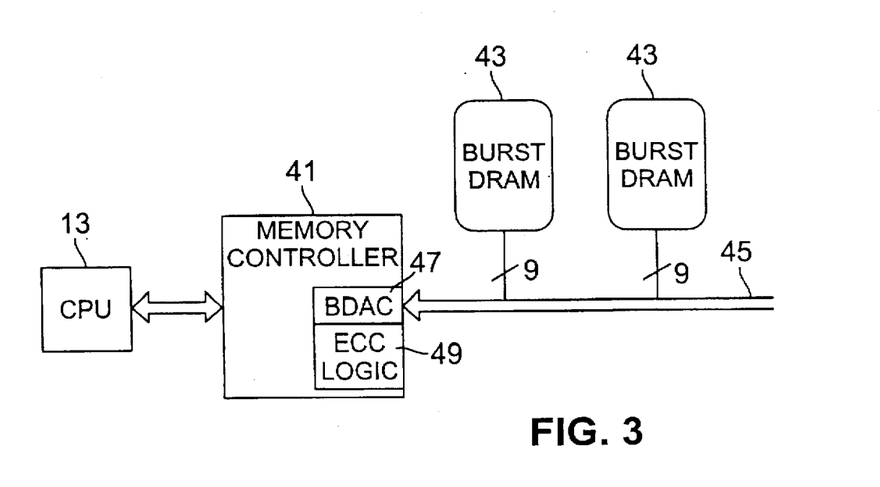
FIG. 3 corresponds to FIG. 2, but incorporates ECC logic in accordance with an embodiment of the invention.

FIG. 2 illustrates a memory subsystem for a computer including at least one burst DRAM device 43 (two shown). The burst DRAM devices 43 communicate with a memory controller 41 via memory bus 45. The data path to each burst DRAM device is nine bits wide, corresponding to 8 data bits and one parity bit. The memory controller 41 may be of any type, and is generic to CMC 19 and DMC 23 in FIG. 1. Memory controller 41 is provided with a burst DRAM ASIC cell (BDAC) 47 that converts the nine-bit wide high speed data from each burst DRAM 43 into data words (e.g., 72 bits including 64 data bits and 8 parity bits) that can be read by memory controller 41 and CPU 13.

Figure 4:
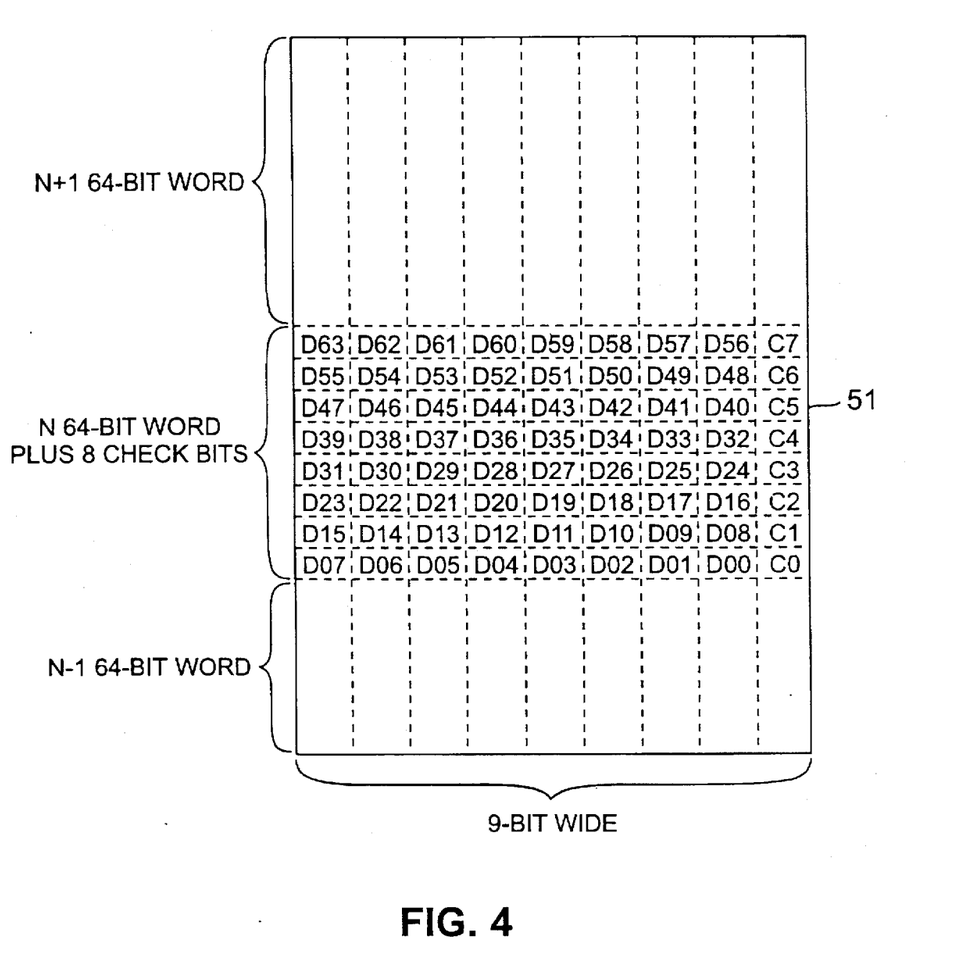
FIG. 4 illustrates a 72-bit nine-bit wide data word in accordance with an embodiment of the invention.
Figure 5:
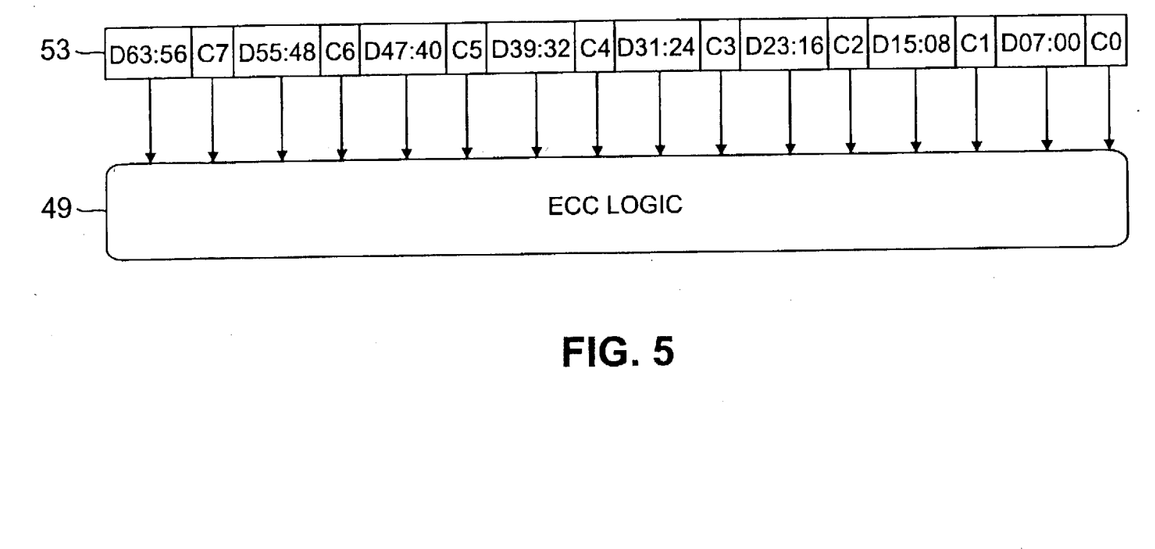
FIG. 5 illustrates a 72-bit wide ECC encoded data word in accordance with an embodiment of the invention.

In accordance with the invention, ECC logic 49 is incorporated in memory controller 41 to allow use of ECCs with the burst DRAM devices. Modification of the number of bits is not necessary, because the ECC of the invention uses only the same 8 check bits per 64 bits of data that are required for conventional parity systems. ECC logic 49 encodes data sent from CPU 13 to be stored in burst DRAM 43 with an optimized ECC described in more detail below. The result is a 72-bit word, of which 64 bits are data and eight bits are check bits. BDAC 47 converts this 72-bit word into a 9-bit wide data stream that is then communicated to one of the burst DRAMs 43. An illustration of the 72-bit word 51 within the burst data stream is provided in FIG. 4. FIG. 5 illustrates this word 51 after re-conversion by BDAC 47 during a read operation into a 72-bit wide word 53 applied to ECC logic 49.

Figure 6:
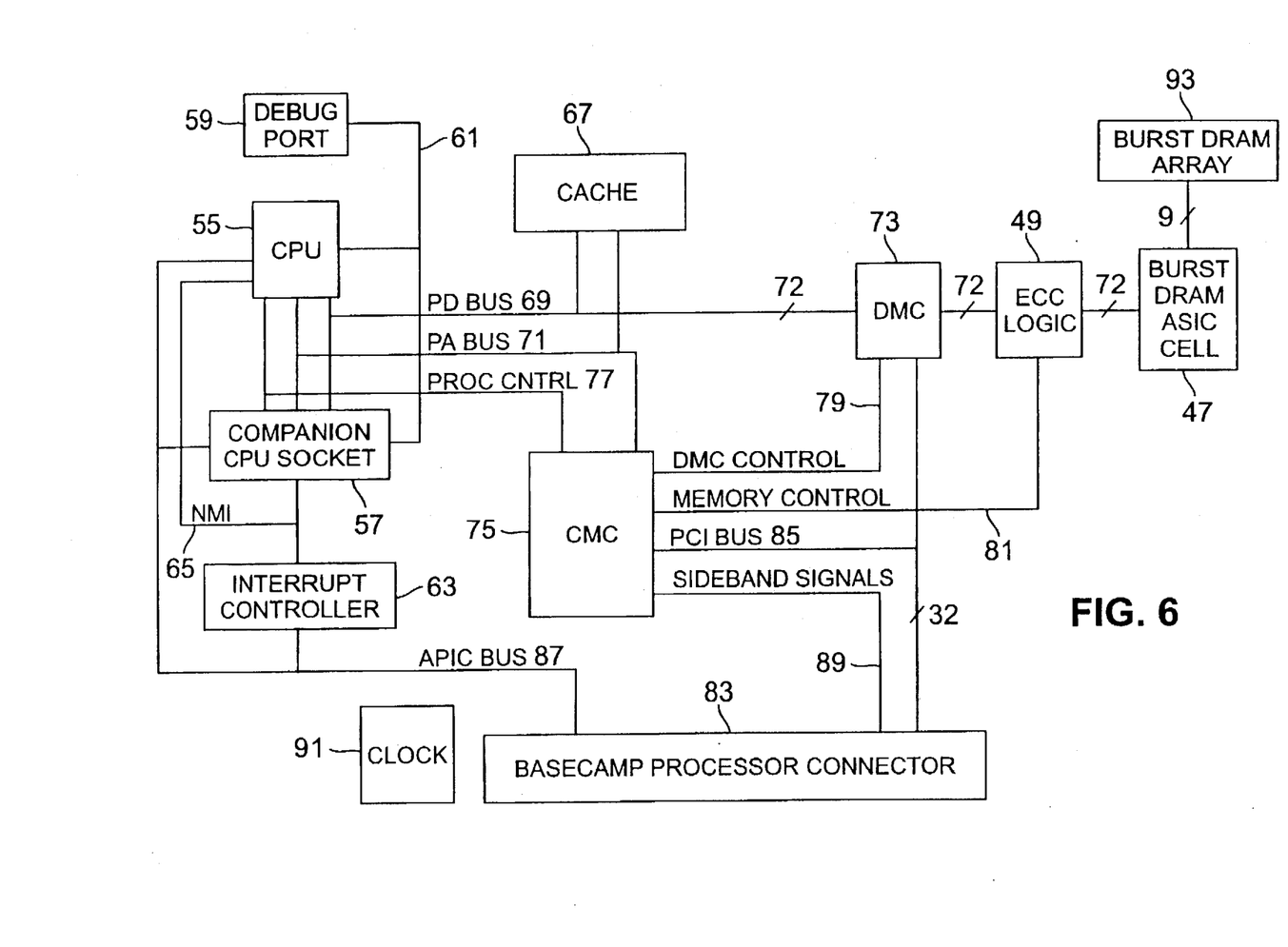
FIG. 6 illustrates a computer system incorporating a burst DRAM array and ECC logic in accordance with an embodiment of the invention.

FIG. 6 is a block diagram representation of a computer system employing burst DRAMs and ECC logic in accordance with an embodiment of the invention. The system comprises a CPU 55, which may be the P54C processor available from Intel. A companion CPU socket 57 is also provided for dual processor implementations, and may be the P54CM socket available from Intel. Both CPU 55 and companion CPU socket 57 communicate with a debug port 59 via a debug signal line 61 and with an interrupt controller 63 via a non-maskable interrupt (NMI) line 65.

On-board cache 67 is provided, preferably 512K L2 cache, that communicates with CPU 55 via processor data (PD) bus 69 and processor address (PA) bus 71. The PD bus 69 is 72 bits wide, and is also applied to DMC 73. CMC 75 communicates with PA bus 71 and also with processor control bus 77. CMC provides DMC control line 79 to DMC 73 and also memory control line 81 to ECC logic 49. A basecamp processor connector 83 provides peripheral interface for both the PCI bus 85 and APIC bus 87. Additional control signals are provided from the CMC 75 to the connector 83 via sideband signal line 89. A clock 91 provides system timing.

ECC logic 49 and burst DRAM ASIC cell 47 are connected via a 72-bit wide bus. The bus connecting BDAC 47 and burst DRAM array 93 is 9 bits wide. Burst DRAM array 93 includes one or more burst DRAMs (not shown). Although BDAC 47, ECC logic 49, and DMAC 73 are shown as separate functional elements in the block diagram of FIG. 6, they need not necessarily be separate physical elements. Each of these elements may be implemented in an ASIC, and depending upon the size of available ASIC packaging all three of these elements may be packaged on the same ASIC. Alternatively, two ASICs could be used, each of which performs all three functions, but handles only 36 bits. Various other alternatives will be apparent to the skilled artisan. Accordingly, it is clear that the particular configuration of these elements is not crucial to the invention.

Figure 7:
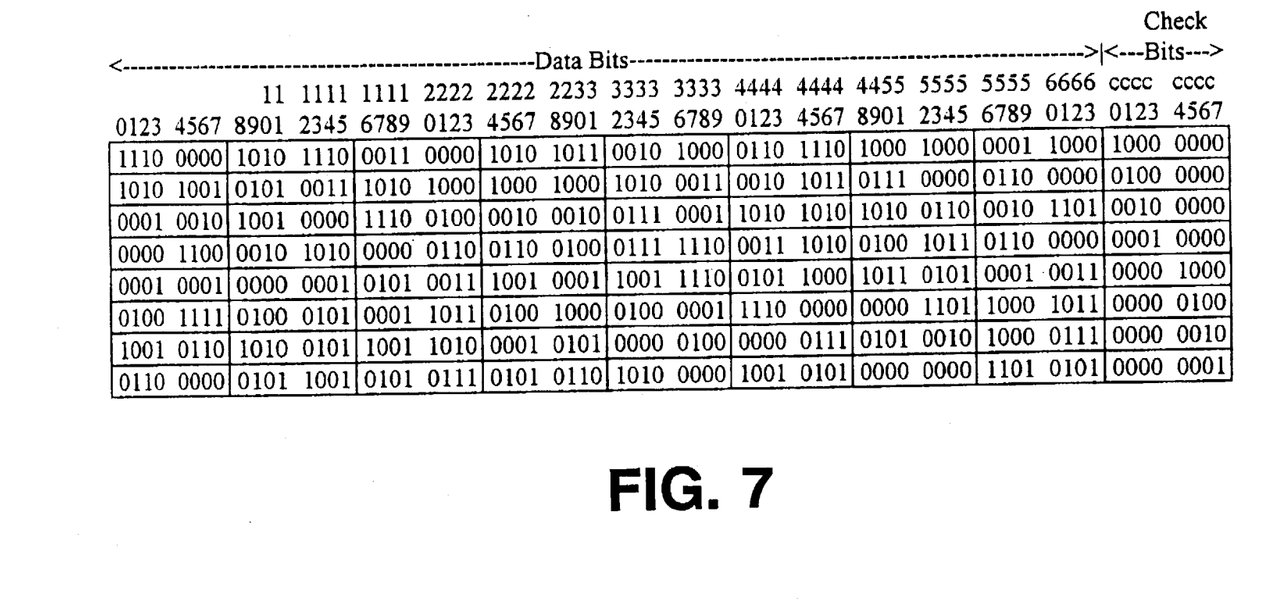
FIG. 7 is a parity-check matrix in accordance with an embodiment of the invention.

FIG. 7 illustrates the parity-check matrix for an error correction code in accordance with the invention. Based upon reliability data of traditional DRAMs, the prevalent memory failures were caused most often by a single bit (soft or hard) error, or the failure of a single DRAM device. The error correction code in accordance with the invention has been designed to maximize memory protection for the data bits, and has been optimized for use with burst DRAM devices. The memory overhead of having this burst DRAM ECC is the same as for byte parity and other ECC schemes such as the (72, 64) Hsiao codes. Thus, there is no additional memory cost. In addition, the ECC in accordance with the invention is able to correct random single bit errors and detect random double bit errors.

To generate the check bits from 64 data bits, an exclusive OR (XOR) operation is performed by ECC logic 49 on the data bits in the locations of each row in the matrix of FIG. 7 having ones. Implementation of the XOR function within an ASIC using Boolean logic is straightforward, and will not be described herein in detail. Performing this operation for each of the 8 rows produces the 8 check bits.

The 64 bits of data and 8 check bits are then written to burst DRAM array 93 via BDAC 47. When a read operation occurs, the 64 data bits and 8 check bits are read from the burst DRAM array, and the XOR operation is again performed on each row, this time including all 72 bits. By performing this operation on each of the 8 rows of the matrix of FIG. 7, 8 syndrome bits S(0–7) are produced.

FIG. 8 illustrates the syndrome table corresponding to this embodiment. As indicated in the upper left hand corner of the table, if all 8 syndrome bits are all zero (00 in hex), no error is detected. If the syndrome bits contain ones, either a single bit (DB), check bit (CB) or multiple bit error (UNCER) is detected. As is apparent from FIG. 8, if the error is a single bit error, i.e., either a single data bit error or a single check bit error, the bit in error is determined by the syndrome table and can be corrected. For multiple bit errors, the error is detected but cannot be corrected. Preferably, a report of all uncorrectable errors is made to the operating system or appropriate system software.

Reporting of errors is a very useful function because it provides important information about the faults to the users or to service personnel. This allows faults to be easily isolated, thus minimizing the system's down time. In accordance with the invention, any error that is detected or corrected can be reported to the system software or stored in a special archive for later use during servicing.

Various embodiments of the invention have been described above in detail with reference to the accompanying figures. However, the invention is not so limited. One of ordinary skill in the art will recognize that the error correction methods, hardware, and codes described may be applied to different memory and data communication systems, different processors with various bit widths, and in various combinations and permutations. Specifically, the memory subsystem illustrated in FIG. 6 is merely an example of one type of system to which the invention is applicable. The ECC of the invention is equally applicable to any type of computer memory subsystem that employs burst DRAM devices. Accordingly, the invention is not limited to the described embodiments, but rather is limited only by the scope of the appended claims.

What is claimed is:

1. A method of detecting and correcting errors in a computer having a memory subsystem comprising a burst DRAM device, comprising the steps of:

beginning a write operation of N data bits to the burst DRAM device;

generating M check bits from said N data bits;

writing said N data bits and said M check bits to the burst DRAM device;

reading said N data bits and M check bits from the burst DRAM device;

generating X syndrome bits from said N data bits and said M check bits;

using said X syndrome bits to detect and correct any single bit error within said N data bits and said M check bits and to detect any double bit error within said N data bits and said M check bits.

2. The method of claim 1, wherein N=64, M=8, and X=8.

3. The method of claim 2, wherein said check bits and said syndrome bits are determined by the parity-check matrix:

| <---- | | | | | | Data Bits | | | | | | | | | ----> | <- Check Bits -> | |
|------|------|------|------|------|------|------|------|------|------|------|------|------|------|------|------|------|
|      |      | 11   | 1111 | 1111 | 2222 | 2222 | 2233 | 3333 | 3333 | 4444 | 4444 | 4455 | 5555 | 5555 | 6666 | cccc | cccc |
| 0123 | 4567 | 8901 | 2345 | 6789 | 0123 | 4567 | 8901 | 2345 | 6789 | 0123 | 4567 | 8901 | 2345 | 6789 | 0123 | 0123 | 4567 |
| 1110 | 0000 | 1010 | 1110 | 0011 | 0000 | 1010 | 1011 | 0010 | 1000 | 0110 | 1110 | 1000 | 1000 | 0001 | 1000 | 1000 | 0000 |
| 1010 | 1001 | 0101 | 0011 | 1010 | 1000 | 1000 | 1000 | 1010 | 0011 | 0010 | 1011 | 0111 | 0000 | 0110 | 0000 | 0100 | 0000 |
| 0001 | 0010 | 1001 | 0000 | 1110 | 0100 | 0010 | 0010 | 0111 | 0001 | 1010 | 1010 | 1001 | 0110 | 0010 | 1101 | 0010 | 0000 |
| 0000 | 1100 | 0010 | 1010 | 0000 | 0110 | 0100 | 0111 | 1110 | 0011 | 1010 | 0100 | 1011 | 0110 | 0000 | 0001 | 0000 | 0000 |
| 0001 | 0001 | 0000 | 0001 | 0101 | 0011 | 1001 | 0001 | 1001 | 1110 | 0101 | 1000 | 1011 | 0101 | 0001 | 0011 | 0000 | 1000 |
| 0100 | 1111 | 0100 | 0101 | 0001 | 1011 | 0100 | 1000 | 0100 | 0001 | 1110 | 0000 | 0000 | 1101 | 1000 | 1011 | 0000 | 0100 |
| 1001 | 0110 | 1010 | 0101 | 1001 | 1010 | 0001 | 0100 | 0000 | 0100 | 0000 | 0111 | 0101 | 0010 | 1000 | 0111 | 0000 | 0010 |
| 0110 | 0000 | 0101 | 1001 | 0101 | 0111 | 0101 | 0110 | 1010 | 0000 | 1001 | 0101 | 0000 | 0000 | 1101 | 0101 | 0000 | 0001 |

4. The method of claim 3, wherein said step of detecting and correcting is performed using the syndrome table:

| 00 No Error | 20 CB05 | 40 CB06 | 60 UNCER | 80 CB07 | A0 UNCER | C0 UNCER | E0 DB56 |
|---|---|---|---|---|---|---|---|
| 01 CB00 | 21 UNCER | 41 UNCER | 61 DB13 | 81 UNCER | A1 DB01 | C1 DB45 | E1 UNCER |
| 02 CB01 | 22 UNCER | 42 UNCER | 62 DB20 | 82 UNCER | A2 DB09 | C2 DB47 | E2 UNCER |
| 03 UNCER | 23 DB28 | 43 DB00 | 63 UNCER | 83 DB02 | A3 UNCER | C3 UNCER | E3 UNCER |
| 04 CB02 | 24 UNCER | 44 UNCER | 64 DB06 | 84 UNCER | A4 DB40 | C4 DB61 | E4 UNCER |
| 05 UNCER | 25 DB60 | 45 DB08 | 65 UNCER | 85 DB30 | A5 UNCER | C5 UNCER | E5 UNCER |
| 06 UNCER | 26 DB39 | 46 DB16 | 66 UNCER | 86 DB11 | A6 UNCER | C6 UNCER | E6 UNCER |
| 07 DB18 | 27 UNCER | 47 UNCER | 67 UNCER | 87 UNCER | A7 UNCER | C7 UNCER | E7 UNCER |
| 08 CB03 | 28 UNCER | 48 UNCER | 68 DB05 | 88 UNCER | A8 DB25 | C8 DB29 | E8 UNCER |
| 09 UNCER | 29 DB52 | 49 DB10 | 69 UNCER | 89 DB12 | A9 UNCER | C9 UNCER | E9 UNCER |
| 0A UNCER | 2A DB04 | 4A DB49 | 6A UNCER | 8A DB57 | AA UNCER | CA UNCER | EA UNCER |
| 0B DB14 | 2B UNCER | 4B UNCER | 6B UNCER | 8B UNCER | AB UNCER | CB UNCER | EB UNCER |
| 0C UNCER | 2C DB33 | 4C DB54 | 6C UNCER | 8C DB21 | AC UNCER | CC UNCER | EC UNCER |
| 0D DB26 | 2D UNCER | 4D UNCER | 6D UNCER | 8D UNCER | AD UNCER | CD UNCER | ED UNCER |
| 0E DB58 | 2E UNCER | 4E UNCER | 6E UNCER | 8E UNCER | AE UNCER | CE UNCER | EE UNCER |
| 0F UNCER | 2F DB42 | 4F DB46 | 6F UNCER | 8F DB34 | AF UNCER | CF UNCER | EF UNCER |
| 10 CB04 | 30 UNCER | 50 UNCER | 70 DB62 | 90 UNCER | B0 DB23 | D0 DB27 | F0 UNCER |

-continued

| | | | | | | | |
|---|---|---|---|---|---|---|---|
| 11 UNCER | 31 DB41 | 51 DB31 | 71 UNCER | 91 DB59 | B1 UNCER | D1 UNCER | F1 DB19 |
| 12 UNCER | 32 DB07 | 52 DB51 | 72 UNCER | 92 DB32 | B2 UNCER | D2 UNCER | F2 DB15 |
| 13 DB24 | 33 UNCER | 53 UNCER | 73 UNCER | 93 UNCER | B3 UNCER | D3 UNCER | F3 UNCER |
| 14 UNCER | 34 DB53 | 54 DB03 | 74 UNCER | 94 DB17 | B4 UNCER | D4 UNCER | F4 DB63 |
| 15 DB48 | 35 UNCER | 55 UNCER | 75 UNCER | 95 UNCER | B5 UNCER | D5 UNCER | F5 UNCER |
| 16 DB50 | 36 UNCER | 56 UNCER | 76 UNCER | 96 UNCER | B6 UNCER | D6 UNCER | F6 UNCER |
| 17 UNCER | 37 UNCER | 57 UNCER | 77 UNCER | 97 UNCER | B7 UNCER | D7 UNCER | F7 UNCER |
| 18 UNCER | 38 DB55 | 58 DB37 | 78 UNCER | 98 DB43 | B8 UNCER | D8 UNCER | F8 DB22 |
| 19 DB36 | 39 UNCER | 59 UNCER | 79 UNCER | 99 UNCER | B9 UNCER | D9 UNCER | F9 UNCER |
| 1A DB38 | 3A UNCER | 5A UNCER | 7A UNCER | 9A UNCER | BA UNCER | DA UNCER | FA UNCER |
| 1B UNCER | 3B UNCER | 5B UNCER | 7B UNCER | 9B UNCER | BB UNCER | DB UNCER | FB UNCER |
| 1C DB35 | 3C UNCER | 5C UNCER | 7C UNCER | 9C UNCER | BC UNCER | DC UNCER | FC UNCER |
| 1D UNCER | 3D UNCER | 5D UNCER | 7D UNCER | 9D UNCER | BD UNCER | DD UNCER | FD UNCER |
| 1E UNCER | 3E UNCER | 5E UNCER | 7E UNCER | 9E UNCER | BE UNCER | DE UNCER | FE UNCER |
| 1F DB44 | 3F UNCER | 5F UNCER | 7F UNCER | 9F UNCER | BF UNCER | DF UNCER | FF UNCER |

5. A computer system having a central processing unit and a memory subsystem, said memory subsystem comprising:
   a burst DRAM device;
   a memory controller arranged to control the burst DRAM device in response to memory instructions;
   data format conversion circuitry arranged to convert between a data format readable by the burst DRAM device and a data format readable by the memory controller; and
   ECC circuitry arranged to encode a data word with an error correction code in response to receipt by the memory controller of a memory write instruction, the ECC circuitry further being arranged to decode said data word and conduct error correcting and detecting upon receipt by the memory controller of a memory read instruction.

6. The system of claim 5, wherein said ECC circuitry is interposed between said memory controller and said data format conversion circuitry.

7. The system of claim 5, wherein the ECC circuitry and the data format conversion circuitry are implemented in an application specific integrated circuit.

8. The system of claim 5, wherein said data word comprises N data bits, and the ECC circuitry comprises:
   means for generating M check bits from the N data bits in response to the write instruction;
   means for generating X syndrome bits from the N data bits and the M check bits in response to the read instruction; and
   means for using the X syndrome bits to detect and correct any single bit error within the N data bits and the M check bits and to detect any double bit error in the N data and said M check bits.

9. The system of claim 8, wherein N=64, M=8, and X=8.

10. The system of claim 9, wherein said check bits and said syndrome bits are determined by the parity-check matrix:

| <---------------------- Data Bits ----------------------> | | | | | | | | | | | | | | | | <- Check Bits -> | |
|---|---|---|---|---|---|---|---|---|---|---|---|---|---|---|---|---|---|
| 0123 | 11 4567 | 1111 8901 | 1111 2345 | 2222 6789 | 2222 0123 | 2233 4567 | 3333 8901 | 3333 2345 | 4444 6789 | 4444 0123 | 4455 4567 | 5555 8901 | 5555 2345 | 6666 6789 | cccc 0123 | cccc 4567 |
| 1110 | 0000 | 1010 | 1110 | 0011 | 0000 | 1010 | 1011 | 0010 | 1000 | 0110 | 1110 | 1000 | 1000 | 0001 | 1000 | 1000 | 0000 |
| 1010 | 1001 | 0101 | 0011 | 1010 | 1000 | 1000 | 1000 | 1010 | 0011 | 0010 | 1011 | 0111 | 0000 | 0110 | 0000 | 0100 | 0000 |
| 0001 | 0010 | 1001 | 0000 | 1110 | 0100 | 0010 | 0010 | 0111 | 0001 | 1010 | 1010 | 1001 | 0110 | 0010 | 1101 | 0010 | 0000 |
| 0000 | 1100 | 0010 | 1010 | 0000 | 0110 | 0110 | 0100 | 0111 | 1110 | 0011 | 1010 | 0100 | 1011 | 0110 | 0000 | .0001 | 0000 |
| 0001 | 0001 | 0000 | 0001 | 0011 | 0011 | 1001 | 0001 | 1001 | 1110 | 0101 | 1000 | 1011 | 0101 | 0001 | 0011 | 0000 | 1000 |
| 0100 | 1111 | 0100 | 0101 | 0001 | 1011 | 0100 | 1000 | 0100 | 0001 | 1110 | 0000 | 0000 | 1101 | 1000 | 1011 | 0000 | 0100 |
| 1001 | 0110 | 1010 | 0101 | 1001 | 1010 | 0001 | 0100 | 0000 | 0100 | 0000 | 0111 | 0101 | 0010 | 1000 | 0111 | 0000 | 0010 |
| 0110 | 0000 | 0101 | 1001 | 0101 | 0111 | 0101 | 0110 | 1010 | 0000 | 1001 | 0101 | 0000 | 0000 | 1101 | 0101 | 0000 | 0001 |

11. The system of claim 10, wherein said step of detecting and correcting is performed using the syndrome table:

| | | | | | | | |
|---|---|---|---|---|---|---|---|
| 00 No Error | 20 CB05 | 40 CB06 | 60 UNCER | 80 CB07 | A0 UNCER | C0 UNCER | E0 DB56 |
| 01 CB00 | 21 UNCER | 41 UNCER | 61 DB13 | 81 UNCER | A1 DB01 | C1 DB45 | E1 UNCER |
| 02 CB01 | 22 UNCER | 42 UNCER | 62 DB20 | 82 UNCER | A2 DB09 | C2 DB47 | E2 UNCER |
| 03 UNCER | 23 DB28 | 43 DB00 | 63 UNCER | 83 DB02 | A3 UNCER | C3 UNCER | E3 UNCER |
| 04 CB02 | 24 UNCER | 44 UNCER | 64 DB06 | 84 UNCER | A4 DB40 | C4 DB61 | E4 UNCER |
| 05 UNCER | 25 DB60 | 45 DB08 | 65 UNCER | 85 DB30 | A5 UNCER | C5 UNCER | E5 UNCER |
| 06 UNCER | 26 DB39 | 46 DB16 | 66 UNCER | 86 DB11 | A6 UNCER | C6 UNCER | E6 UNCER |
| 07 DB18 | 27 UNCER | 47 UNCER | 67 UNCER | 87 UNCER | A7 UNCER | C7 UNCER | E7 UNCER |
| 08 CB03 | 28 UNCER | 48 UNCER | 68 DB05 | 88 UNCER | A8 DB25 | C8 DB29 | E8 UNCER |
| 09 UNCER | 29 DB52 | 49 DB10 | 69 UNCER | 89 DB12 | A9 UNCER | C9 UNCER | E9 UNCER |
| 0A UNCER | 2A DB04 | 4A DB49 | 6A UNCER | 8A DB57 | AA UNCER | CA UNCER | EA UNCER |
| 0B DB14 | 2B UNCER | 4B UNCER | 6B UNCER | 8B UNCER | AB UNCER | CB UNCER | EB UNCER |
| 0C UNCER | 2C DB33 | 4C DB54 | 6C UNCER | 8C DB21 | AC UNCER | CC UNCER | EC UNCER |
| 0D DB26 | 2D UNCER | 4D UNCER | 6D UNCER | 8D UNCER | AD UNCER | CD UNCER | ED UNCER |
| 0E DB58 | 2E UNCER | 4E UNCER | 6E UNCER | 8E UNCER | AE UNCER | CE UNCER | EE UNCER |

-continued

| | | | | | | | |
|---|---|---|---|---|---|---|---|
| 0F UNCER | 2F DB42 | 4F DB46 | 6F UNCER | 8F DB34 | AF UNCER | CF UNCER | EF UNCER |
| 10 CB04 | 30 UNCER | 50 UNCER | 70 DB62 | 90 UNCER | B0 DB23 | D0 DB27 | F0 UNCER |
| 11 UNCER | 31 DB41 | 51 DB31 | 71 UNCER | 91 DB59 | B1 UNCER | D1 UNCER | F1 DB19 |
| 12 UNCER | 32 DB07 | 52 DB51 | 72 UNCER | 92 DB32 | B2 UNCER | D2 UNCER | F2 DB15 |
| 13 DB24 | 33 UNCER | 53 UNCER | 73 UNCER | 93 UNCER | B3 UNCER | D3 UNCER | F3 UNCER |
| 14 UNCER | 34 DB53 | 54 DB03 | 74 UNCER | 94 DB17 | B4 UNCER | D4 UNCER | F4 DB63 |
| 15 DB48 | 35 UNCER | 55 UNCER | 75 UNCER | 95 UNCER | B5 UNCER | D5 UNCER | F5 UNCER |
| 16 DB50 | 36 UNCER | 56 UNCER | 76 UNCER | 96 UNCER | B6 UNCER | D6 UNCER | F6 UNCER |
| 17 UNCER | 37 UNCER | 57 UNCER | 77 UNCER | 97 UNCER | B7 UNCER | D7 UNCER | F7 UNCER |
| 18 UNCER | 38 DB55 | 58 DB37 | 78 UNCER | 98 DB43 | B8 UNCER | D8 UNCER | F8 DB22 |
| 19 DB36 | 39 UNCER | 59 UNCER | 79 UNCER | 99 UNCER | B9 UNCER | D9 UNCER | F9 UNCER |
| 1A DB38 | 3A UNCER | 5A UNCER | 7A UNCER | 9A UNCER | BA UNCER | DA UNCER | FA UNCER |
| 1B UNCER | 3B UNCER | 5B UNCER | 7B UNCER | 9B UNCER | BB UNCER | DB UNCER | FB UNCER |
| 1C DB35 | 3C UNCER | 5C UNCER | 7C UNCER | 9C UNCER | BC UNCER | DC UNCER | FC UNCER |
| 1D UNCER | 3D UNCER | 5D UNCER | 7D UNCER | 9D UNCER | BD UNCER | DD UNCER | FD UNCER |
| 1E UNCER | 3E UNCER | 5E UNCER | 7E UNCER | 9E UNCER | BE UNCER | DE UNCER | FE UNCER |
| 1F DB44 | 3F UNCER | 5F UNCER | 7F UNCER | 9F UNCER | BF UNCER | DF UNCER | FF UNCER |

\* \* \* \* \*